United States Patent
Milhas

(10) Patent No.: US 6,916,050 B2
(45) Date of Patent: Jul. 12, 2005

(54) SINGLE-PIECE SNAP-ON CONNECTION

(75) Inventor: Pierre Milhas, Vitry le Francois (FR)

(73) Assignee: Nobel Plastiques (FR)

( * ) Notice: Subject to any disclaimer, the term of this patent is extended or adjusted under 35 U.S.C. 154(b) by 0 days.

(21) Appl. No.: 10/416,402

(22) PCT Filed: Aug. 30, 2002

(86) PCT No.: PCT/FR02/02969
§ 371 (c)(1),
(2), (4) Date: May 12, 2003

(87) PCT Pub. No.: WO03/025449
PCT Pub. Date: Mar. 27, 2003

(65) Prior Publication Data
US 2004/0036284 A1 Feb. 26, 2004

(30) Foreign Application Priority Data
Sep. 13, 2001 (FR) .......................................... 01 11831

(51) Int. Cl.⁷ .............................................. F16L 39/00
(52) U.S. Cl. ........................ 285/320; 285/319; 285/317
(58) Field of Search ................................. 285/320, 319, 285/317

(56) References Cited

U.S. PATENT DOCUMENTS 4,793,639 A 12/1988 Glover et al. ............... 285/319

FOREIGN PATENT DOCUMENTS

| DE | 3933590 | 2/1991 |
|---|---|---|
| DE | 29514822 | 1/1996 |
| EP | 0530485 | 3/1993 |
| EP | 0605801 | 7/1994 |
| EP | 0982525 | 12/2002 |
| FR | 2753774 | 3/1998 |
| WO | 9828566 | 7/1998 |

*Primary Examiner*—David Bochna
(74) *Attorney, Agent, or Firm*—Dykema Gossett PLLC

(57) ABSTRACT

A female snap-on connection is provided for cooperating with a male catching end piece with central barrel and flange ring. The snap-on connection includes a body made of rigid plastic material and a tubular portion with raised parts for connection to a pipe and a portion forming a stepped cylindrical cavity to receive at least the barrel end, and at the front of the body, a lock made of rigid plastic material to be urged to lock the flange ring once the latter is set in plane, the lock and the body are secured together by at least a flexible part so as to form a single piece, at least an annular joint ensuring tightness; the lock tilts on a hinge pin formed by the flexible part(s).

30 Claims, 1 Drawing Sheet

SINGLE-PIECE SNAP-ON CONNECTION

FIELD OF THE INVENTION

The present invention relates to a female snap coupler for cooperating with a flanged male fastening end-fitting.

BACKGROUND INFORMATION

It is usual, in particular in the automobile industry, to use snap couplers for the rapid connection of a fluid (for example fuel, oil or water) circuit element to another circuit element and for disconnection therefrom. In a substantially standardized manner, the industry uses male end-fittings having a cylindrical barrel surrounded by a flange, and the female couplers have a stepped cylindrical cavity, for housing at least the end of the barrel, and a resilient lock for locking the rear of the flange once the latter is in place. O-ring seals ensure sealing.

In most commercial couplers, the body of the coupler, generally made of molded thermoplastic, the lock, more often than not also made of a molded thermoplastic or possibly a metal, and the seals, generally made of an elastomer, consist of separate parts that are assembled, which makes the manufacture more complicated and increases the cost. This is the case, for example, with the coupler known from document FR 2 753 774 A, the lock of which is formed from a substantially undeformable ring that can slide radially between an off-center locking position and a centered protraction position, spring means allowing the ring to be returned from the retracted position to its off-center position. This is also the case with the coupler known from document EP 0 605 801 A, the lock of which is formed from a separate, elastically deformable piece of oval or diamond shape, certain parts of which lie, in the rest state, behind the flange, and can, when pressure is exerted on them, move away radially so as to let the flange pass. In such devices, if the sealing system consisting of one or two elastomer seals is included, there is a total of 5 to 7 pieces that must be assembled on an automatic machine in order to form the coupler. To partly solve this problem, in an alternative form of the latter device that has been commercialized, the separate part of oval shape is molded in one piece with the body, said piece being connected by two arms to the rear of said body. A rather similar device is shown in patents EP 0 530 485 and DE3 933 590. The plastic chosen for producing the piece is necessarily quite a rigid plastic with light elasticity, such as nylon-6,6. Such arrangements prove to be quite fragile, and the deformation of the oval is not easy to control and there is a risk of causing permanent set, or even destruction, of the linking arms.

Document EP 0 982 525 in the name of the Applicant discloses a female snap coupler for cooperating with a male fastening end-fitting of the type with a central barrel and a flange, the coupler comprising, on the one hand, a body made of a rigid plastic and having a tubular part with raised features for connecting to a pipe and a part forming a stepped cylindrical cavity for housing at least the end of the barrel and, on the other hand, at the front of the body, a lock, also made of a rigid material, intended for locking the flange once the latter is in place, the lock and the body being fastened together by at least one flexible piece overmolded using dual-injection molding, at least one annular seal ensuring that it sealed. The lock is made in the form of a ring with radial movement, supported by linking arms.

SUMMARY OF THE INVENTION

The objective of the invention is to provide an alternative to this construction, that is to say a coupler which requires fewer pieces to be mounted than the usual couplers, but which is easy to operate and has a long lifetime.

The invention achieves its objective by means of a female snap coupler for cooperating with a male fastening end-fitting of the type having a central barrel and a flange, the coupler comprising, on the one hand, a body made of a rigid plastic and having a tubular part with raised features for connecting with a pipe and a part forming a stepped cylindrical cavity for housing at least the end of the barrel and, on the other hand, at the front of the body, a lock made of a rigid plastic for locking the flange once the latter is in place, the lock and the body being fastened together by at least one flexible piece so as to form a one-part assembly, at least one annular seal ensuring that it is sealed, characterized in that the lock is a piece that can rock about a pivot pin formed by the flexible piece or pieces.

An effective and durable locking system is thus obtained. This system may be adjusted to the desired hardness so as to match the mounting stresses. A taper on the internal face of the moving lock may help in locking. The lock is housed in a notch in an at least partially cylindrical skirt of the body. The body also serves as a longitudinal stop for the flange of the male piece. The latter remains visible after snap-fitting, this being one of the major advantages of the present invention, both as regards the ease of inspection and the possibility of thus obtaining a color polarization on the male piece and on the female piece. This is because standard female couplers color one of their pieces, generally the retention piece, while the male end-fitting is already of the same color, since after mounting the latter is invisible. In this case, only the male piece needs to be colored. The advantage lies in the reduction in diversity of the part numbers to be created (only one part number for the female pieces and one part number per color of the male piece), which represents a substantial saving.

The whole unit is preferably produced by dual-injection molding or over molding of two pieces (body and lock) injection-molded separately, the flexible part serving as pivot being the overmolded material.

The materials chosen for producing the body, the lock and the flexible pivot are chosen especially according to the specification (chemical resistance to the fluid transported, permeability to fuel, etc.) of the coupler and the assembly technique chosen.

The rigid thermoplastic of the body is advantageously a polyolefin or a polyacetal, or preferably a polyamide, especially a polyamide of the PA-6, PA-12 or PA-6,6 type, to which glass or carbon fibers or other additives, such as fillers to ensure electrical conduction or fire retardants, may optionally be added. The flexible plastic of the pivot may be a thermoplastic or an elastomer, especially an EPDM (ethylene-propylene terpolymer), FPM (or FKM, a fluorocarbon rubber), HBNR (hydrogenated nitrile rubber), TPE (a thermoplastic elastomer with no vulcanized predominant phase), TPV (thermoplastic incorporating a vulcanized phase) or TPO (a thermoplastic olefin elastomer), etc. The plastic is selected for its good torsional strength properties, and the two plastics, the rigid one and the flexible one, must adhere to each other. If an elastomer is chosen for the pivot, for example an EPDM, if necessary an adhesion promoter is applied, (for example by spraying) between the phase of injection-molding the thermoplastic and injection-molding the elastomer, so as to bond the elastomer to the thermoplastic. It is also possible, without using an adhesion promoter, to achieve chemical bonding by interdiffusion of the elastomer and the thermoplastic at the interface by choosing certain appropriate pairs of materials, for example using the technology known by the name K&K developed by Hüls A. G. (the reader may refer inter alia to the patent EP 0 344 427 A).

By producing the coupler as indicated, and especially by co-injection molding, the number of pieces needed to produce the coupler is minimized, thereby reducing the handling and assembling costs.

Only the sealing function has to be added: with conventional sealing provided by a seal/spacer system, it is preferred to use a seal/ring (or several of them) supporting the seals made by dual-injection molding. The coupler and the seal/ring are assembled simply by force-fitting, adhesive bonding or welding.

As regards the seal/ring, the elastomer forming the seal is advantageously a rubber formulation based on FPM, FKM (fluorocarbon), XNBR (carboxylated nitrile), HNBR (hydrogenated nitrile) or EPDM rubbers.

A better understanding of the invention will be gained from the description that follows, with reference to the appended schematic drawings showing, by way of example, one embodiment of the coupler according to the invention. Other advantages and features will become apparent on reading the description.

DETAILED DESCRIPTION OF A PREFERRED EMBODIMENT

The coupler 1 comprises a body 2 made of a rigid plastic and a fastening part or lock 3, also made of a rigid plastic.

Figure 1:
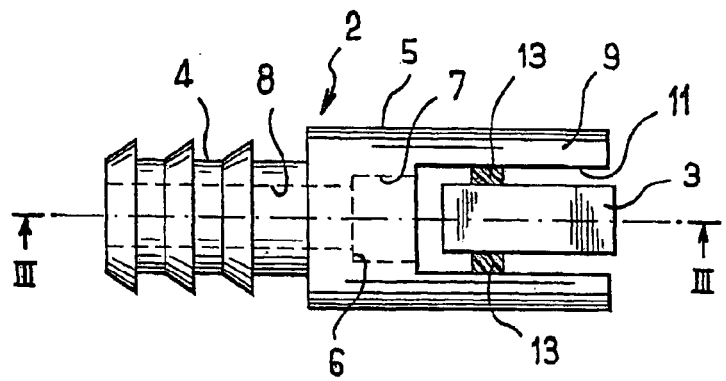
FIG. 1 is a side view of the body of the coupler.
Figure 2:
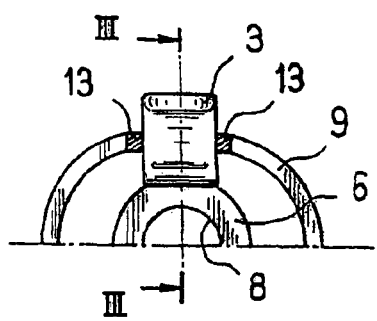
FIG. 2 is a half-view from the end of the body of the coupler in FIG. 1 (FIG. 2 is distorted to allow a better view of the various constituents).
Figure 3:
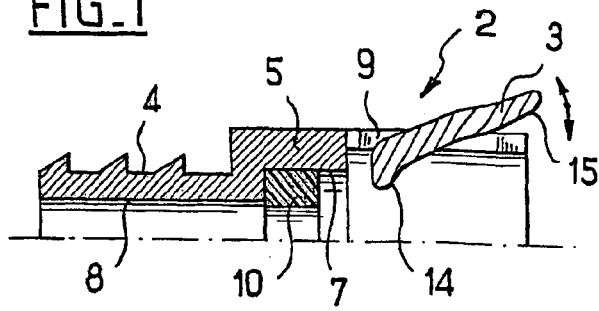
FIG. 3 is a III—III half-section of the body in FIGS. 1 and 2.
Figure 4:
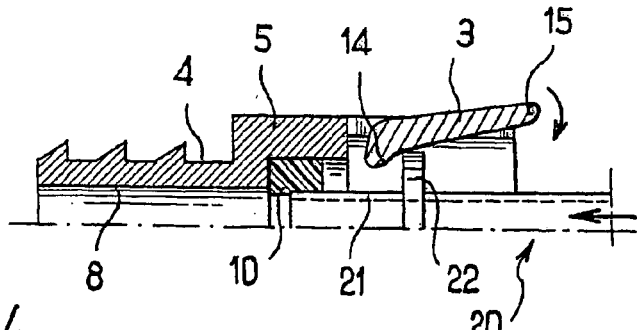
FIG. 4 is a half-side view of the complete coupler during mounting.
Figure 5:
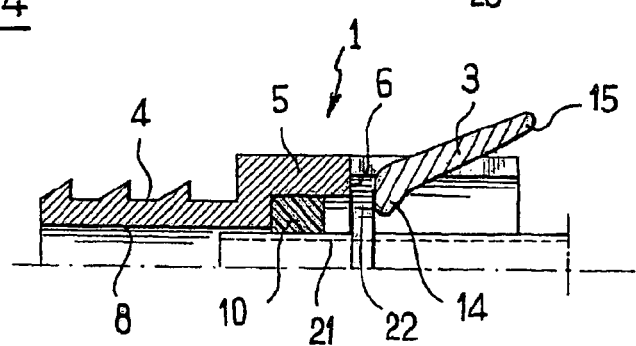
FIG. 5 is half-side view of the complete coupler mounted.

The body 2 has, at the rear, a hollow cannelated tail 4, in the form of fir tree teeth as shown or a doubly bulbous tail, designed to be force-fitted into a pipe, and, at the front, a cylindrical cup 5 forming, with the tail, a cylindrical cavity 7, 8 with one or more steps 6. The cylindrical cup 5 is extended over at least part of its periphery by a thinner skirt 9, which is approximately cylindrical, an upper part of which includes a broad notch 11 for housing the rectangular lock 3. The latter is connected to the sidewalls of the notch 11, and therefore to the skirt 9, by two flexible pivots 13 made by dual, plastic-elastic, injection molding. The two pivots 13 lie on an axis orthogonal to the longitudinal axis of the body 2, so as to make the lock 3 rock in or parallel to a plane passing through the axis of the body 2 (the plane of FIGS. 3, 4 and 5). The lock 3 includes a lower terminal locking shoulder 14. The lock 3 is molded in relation to the body 2 and to the pivots 13 in the balanced position shown in FIG. 3, that is to say with the locking shoulder penetrating the inside of the skirt 9 and the opposed, gripping part 15 penetrating to the outside of said skirt 9.

A seal/ring 10, produced, for example, by dual-injection molding, is placed on the step 6.

To snap onto the male end-fitting 20 with the barrel 21 and the flange 22, said end-fitting is introduced into the female end-fitting (FIGS. 4 and 5): the flange 22 pushes the shoulder 14 of the lock 3 radially outward, which pivots on the resilient pieces 13. The barrel 21 penetrates partially into the cylindrical cavity 8 and clamps the seal 10 to the passage. The flange 22, once it has passed the lock 3, butts against the step 6. The lock 3 returns elastically to its original position, in which the shoulder 14 is placed in front of the flange 22 and locks it. To release the flange 22 and disconnect the coupler, all that the user has to do is to press on the gripping part 15 of the lock 3. Because the notch 11 is longer than would only be needed for the lock 3, the flange 22 may be seen in place from above the window 11 and in this way it is thus possible to ensure that it has been positioned properly.

The embodiment that has just been described is particularly advantageous in that the coupler consists of only two parts—the one-piece coupler and the sealing ring.

In one embodiment intended for a fuel circuit, the body 2 and the lock 3 are made of PA-6,6 filled with glass fibers (1800 MPa modulus) co-injection-molded with a SEBS-based TPE compatible with PA-6,6 with a 60 Shore D hardness.

The invention affords the following advantages:
- effective system for locked retention;
    - secure snap-fastening by locking in the rest position;
    - geometrically simple piece;
    - electrical continuity ensured (butt contact of the male piece in the female piece) in the case in which the body and the male end-fitting are both made of conducting materials;
    - mounting force tailored according to the application, simply by varying the hardness of the elastomer serving as pivot;
- snap-fastening function and body as a single unit, thereby reducing the number of pieces;
- display of the ring of the male piece in the engaged position, making it possible to see incorrect snap-fastening,
- small overall size of the coupler, with no complicated locking mechanism; and
- coupler that can be manufactured in a wide variety of materials.

What is claimed is:

1. A female snap coupler for cooperating with a male end-fitting, wherein the male end-fitting includes a central barrel and a flange at the central barrel, the female snap coupler comprising:

a body having a front, a back, and a tubular portion at the back and configured to force-fit to a pipe, the body being formed from a first material;

a cup coupled to the body, the cup forming a cavity for receiving at least an end of the central barrel of the male end-fitting;

an annular seal positioned within the cavity and shaped for producing a seal between the cup and the central barrel of the male end-fitting;

a lock arranged at the front of the body and configured to cooperate with the flange of the male end-fitting for locking the flange of the male end-fitting when the central barrel of the male end-fitting is received within the cavity of the cup, the lock being formed from a second material; and a flexible portion for coupling the lock to the body, the flexible portion defining a pivot axis about which the lock is pivotable to a position for locking the flange of the male end-fitting, the flexible portion being formed from a third material that is more flexible than the first and second materials of the body and the lock, respectively, the flexible portion, the lock, and the body forming a single integral assembly.

2. The coupler as claimed in claim 1, wherein the body further includes a skirt having a notch, the lock being at least partially positioned within the notch of the skirt.

3. The coupler as claimed in claim 2, wherein the flexible portion is made together with the body and the lock by co-injection molding or overmolding.

4. The coupler as claimed in claim 3, wherein at least one of the first and the second materials includes at least one plastic selected from the group consisting of polyamides, polyolefines and polyacetals.

5. The coupler as claimed in claim 4, wherein the third material includes at least one of a thermoplastic and an elastomer.

6. The coupler as claimed in claim 5, wherein the annular seal includes a sealing ring produced by co-injection molding.

7. The coupler as claimed in claim 4, wherein the annular seal includes a sealing ring produced by co-injection molding.

8. The coupler as claimed in claim 3, wherein the third material includes at least one of a thermoplastic and an elastomer.

9. The coupler as claimed in claim 8, wherein the annular seal includes a sealing ring produced by co-injection molding.

10. The coupler as claimed in claim 3, wherein the annular seal includes a sealing ring produced by co-injection molding.

11. The coupler as claimed in claim 2, wherein at least one of the first and second materials includes at least one plastic selected from the group consisting of polyamides, polyolefines and polyacetals.

12. The coupler as claimed in claim 11, wherein the third material includes at least one of a thermoplastic and an elastomer.

13. The coupler as claimed in claim 12, wherein the annular seal includes a sealing ring produced by co-injection molding.

14. The coupler as claimed in claim 11, wherein the annular seal includes a sealing ring produced by co-injection molding.

15. The coupler as claimed in claim 2, wherein the third material includes at least one of a thermoplastic and an elastomer.

16. The coupler as claimed in claim 15, wherein the annular seal includes a sealing ring produced by co-injection molding.

17. The coupler as claimed in claim 2, wherein the annular seal includes a sealing ring produced by co-injection molding.

18. The coupler as claimed in claim 1, wherein at least one of the first and the second materials includes at least one plastic selected from the group consisting of polyamides, polyolefines and polyacetals.

19. The coupler as claimed in claim 18, wherein the third material includes at least one of a thermoplastic and an elastomer.

20. The coupler as claimed in claim 19, wherein the annular seal includes a sealing ring produced by co-injection molding.

21. The coupler as claimed in claim 18, wherein the annular seal includes a sealing ring produced by co-injection molding.

22. The coupler as claimed in claim 1, wherein the third material includes at least one of a thermoplastic and an elastomer.

23. The coupler as claimed in claim 22, wherein the annular seal includes a sealing ring produced by co-injection molding.

24. The coupler as claimed in claim 1, wherein the annular seal includes a sealing ring produced by co-injection molding.

25. The coupler as claimed in claim 1, wherein the first material is a rigid plastic and the third material is a flexible plastic.

26. The coupler as claimed in claim 25, wherein the second material is a rigid plastic.

27. The coupler as claimed in claim 1, wherein the first material is the same as the second material.

28. The coupler as claimed in claim 1, wherein the cavity of the cup is a stepped cavity.

29. The coupler as claimed in claim 1, wherein the cavity of the cup is a cylindrical cavity.

30. In combination, the coupler as claimed in claim 1 and a male end-fitting, wherein the male end-fitting includes a central barrel and a flange at the central barrel, the central barrel being positioned within the cup of the coupler, and the lock of the coupler engaging the flange of the male end-fitting in the cup.

* * * * *